United States Patent [19]
Letter

[11] Patent Number: 5,134,518
[45] Date of Patent: Jul. 28, 1992

[54] MISSILE WINDOWS
[75] Inventor: Eugene C. Letter, Rochester, N.Y.
[73] Assignee: Bausch & Lomb Incorporated, Rochester, N.Y.
[21] Appl. No.: 551,590
[22] Filed: Jul. 11, 1990
[51] Int. Cl.$^5$ .............................................. G02B 5/00
[52] U.S. Cl. ................... 359/350; 359/894; 102/213; 244/3.16
[58] Field of Search ......... 350/1.1, 1.2, 319; 165/9.3, 9.4; 501/40; 102/213, 293; 244/3.16; 264/1.2; 359/350, 355, 894

[56] References Cited

U.S. PATENT DOCUMENTS

| | | |
|---|---|---|
| 3,431,326 | 3/1969 | Letter . |
| 3,502,386 | 3/1970 | Letter . |
| 3,724,924 | 4/1973 | Lenfant et al. ................... 350/1.1 |
| 4,930,731 | 6/1990 | Roy et al. ....................... 102/293 |
| 4,979,181 | 12/1990 | Nakanose et al. .................. 372/57 |

OTHER PUBLICATIONS

Musikant, *Optical Materials*, Marcel Dekker, Inc., pp. 23-62, Ch. 2.
Barr & Stroud Data Sheet.
General Dynamics Missile Command Specifications MIS-236980, 1984.
*Handbook of Glass Properties*, Bansal and Doremus, Academic Press 1986, Ch. 12, pp. 363-377.

Primary Examiner—Scott J. Sugarman
Assistant Examiner—J. P. Ryan
Attorney, Agent, or Firm—James B. Bieber

[57] ABSTRACT

The use of single crystal $MgF_2$ material as a window for missile systems has at least the advantages of having superior transmission for both the UV and IR wavelength regions, being stable in sunlight, having a low refractive index, thereby eliminating the necessity for anti-reflection coatings, being unaffected by water, therefore eliminating the need to provide wetness protection, having the mechanical strength to match the applicable usage, being able to be fabricated without excessive complication, thereby reducing manufacturing costs while assuring a high quality product, generating low scatter and being readily available from multiple domestic sources.

7 Claims, 4 Drawing Sheets

MISSILE WINDOWS

BACKGROUND OF THE INVENTION

The high cost of windows for optical guidance systems of missiles has long been a concern. This has been made more critical by current needs to obtain high transmission over more than one region of wavelength, severely limiting the choice of materials which can be used. For example, the Stinger POST and Stinger RMP systems both require windows which transmit not only in the infrared (IR) but also in the ultraviolet (UV) spectral range. This dual transmission need, along with other requirements, have resulted in the specification of a single material, calcium aluminate glass as the standard window. As the program matured, expected cost reductions were not achieved and a research and development program was initiated to examine the causes.

Not only has the specified calcium aluminate glass increased in cost, but the quality of that material continues to vary over time, resulting in problems which continue to effect yields. The fundamental purpose of the window is to provide a means for the sealed optical guidance system of the missile to "see" the target. For that reason the transmission of the window in the ultraviolet and the infrared spectral ranges is an overriding and crucial requirement. Calcium aluminate glass has marginal transmission at the extreme of both the ultraviolet and infrared spectral ranges. This is exacerbated by variations and problems associated with the calcium aluminate which material includes: failure of the window to meet transmission requirements for the ultraviolet and infrared wavelength regions, internal inclusions, bubbles and devitrification which result in scatter of wavelengths being received, internal striae (index variations in the glass) which result in distortion of the optical path, high refractive index of the glass material, requiring an antireflection (AR) coating for two widely separated wavelength regions to meet typical transmission requirements, and water solubility of the material which necessitates the inclusion of a coating to protect the calcium aluminate window in use, but which makes the glass difficult to fabricate because maximum polishing rates are obtained with water based slurries of the selected obtained polishing compounds which, unless used with great care, etch and stain the polished surface. This severe surface staining and surface etching reduces transmission and results in scatter, with the effect of scatter being intensified by the required combination antireflection AR and protective coating.

Further, calcium aluminate glass leads to frequent failures in burst and proof tests due to the material's wide variations in rupture modulus as defined in ASTM C 158. This is inherent in the glass due to the lack of a well ordered structure. Proof and burst tests comprise sealing the window onto an airtight chamber and applying a first specified pressure, known as the proof pressure, for a specified time and noting that the window withstands that pressure for that time. This is followed by applying a second specified pressure, the burst pressure, and noting if the windows fracture or break at that pressure. Also coloration results when the calcium aluminate glass is exposed to sunlight or UV radiation and causes corresponding reduction in the UV and visible transmission of the glass.

The physical and chemical properties of the calcium aluminate glass which are the cause of these problems and the cause of resulting process complications are inherent in the material and the best solution to the problems noted above is to develop an alternative material without such undesirable characteristics.

A range of oxide, halide, and sulfide materials which transmitted in the desired wavelength regions were surveyed and a number chosen for more detailed consideration. These included glasses as well as polycrystalline and monocrystalline materials.

The glasses of sufficient transmission in the UV/visible (wavelengths of 300–500 nm) and IR (wavelengths of 0.8–5μm), including germanate and various fluoride based glasses, all lacked sufficient strength, i.e. a modulus of rupture less than 12,800 psi, to meet specifications. In addition, the wide statistical distribution of strengths in such glasses makes it impracticable and improbable that a glass window can meet the narrow range of proof/burst pressures specified without incurring some unacceptable percentage of continuing rejects and thereby complicating the quality assurance procedure and increasing costs.

A number of polycrystalline and monocrystalline oxides have sufficient transmission and strength to meet Stinger POST and Stinger RMP specifications. These include sapphire, spinel, yttria and ALON# material. These materials are available as follows: sapphire from Crystal Systems Inc. of Salem, MA; Spinel from Alpha Optical Systems, Inc. of Ocean Springs, MS; yttria from GTE Laboratories Inc. of Walthan, MA; and ALON TM material from Raytheon Co. of Walthan, MA.

All of such materials have a sufficiently high refractive index, i.e. above 1.50, and therefore require an anti-reflection coating to eliminate reflection loss. In addition, all require burst risers to reduce the burst pressures to be within the specified values. A burst riser can be defined as a circular pattern ground into the center of one window surface in a manner to induce a controlled stress in the window. A burst riser might also include any structural or mechanical variation in the glass, or possibly an inclusion, such as a foreign element or a variation in the material or chemical composition. With the exception of the costly single crystal sapphire, all exhibit transmission scatter problems with the problem in ALON TM material being particularly severe due to numerous gaseous inclusions at the grain boundaries.

SUMMARY OF INVENTION

Single crystal magnesium fluoride ($MgF_2$) windows for ballistic systems offer superior performance at reduced costs over the current calcium aluminate windows. Prototype windows fabricated from single crystal boule have been found to meet or exceed all specifications for certain ballistic missile windows, including Stinger POST and Stinger RMP windows.

The transmission of the uncoated $MgF_2$ window exceeds requirements by a significant margin, making possible an increase in the performance margin of the total missile system. The $MgF_2$ window transmission is not changed by sunlight and UV radiation. In contrast a calcium aluminate glass colors and loses transmission rapidly in sunlight and when exposed to UV radiation.

Because of $MgF_2$'s low refractive index, no anti-reflection coating is required. Nor is any protective coating necessary against humidity and rain, since unlike calcium aluminate glass, $MgF_2$ is not attacked by water to any significant degree. In addition, the rupture modulus, as hereinafter defined, of single crystal MgF$_2$ is a close match for the required proof and burst requirements, as hereinafter defined, of stinger RMP windows. The elimination of these two manufacturing operations, coating and burst riser drilling, decreases both costs and product variability. In addition, the inertness of MgF$_2$ to water reduces the susceptibility of the window staining during processing, again assuring a higher quality product since window staining can result in scatter and reduced transmission.

Other improvements in window quality due to the use of the single crystal MgF$_2$ material include the absence of striae, bubbles, devitrification and other inclusions in the fabricated window.

BRIEF DESCRIPTION OF THE DRAWINGS

The accompanying drawings form part of the instant specification and are to be read in conjunction therewith and in which like reference numbers are used to indicate like parts in the various FIGURES.

DESCRIPTION OF PREFERRED EMBODIMENT

Figure 1:
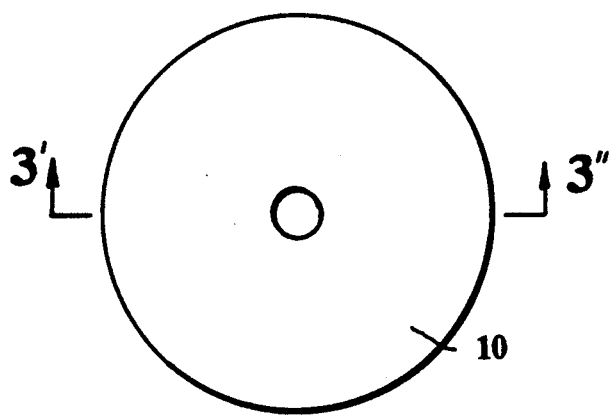
FIG. 1 is a plan view of an exemplary missile window.

One material stands out as having a near perfect property match to the specifications set forth for a Stinger RMP window 10 as exemplarily illustrated in FIG. 1. These specifications generally are transmission, strength, and environmental durability, and are further detailed in U.S. military specifications, including Mis-23698, Drawing 13099545 and Drawing 13154966, all of which are available from the U.S. Army Missile Command, Redstone Arsenal, AL. The near perfect material is formed from the elements of magnesium and fluorine and is single crystal MgF$_2$.

The refractive index is sufficiently low, i.e. below 1.40, so that no anti-reflection coating is necessary. Also, its strength is a perfect match for the proof/burst requirements. In addition, the material as polycrystalline MgF$_2$ has had a long and well documented use as an IR transmitting material for windows in the earlier Stinger missile, and for domes in a number of missiles, including the Stinger, Sidewinder, and Chapperal missiles. Due to the polycrystalline grains, non-cubic structure, and random grain orientation, scatter occurs at UV wavelengths and the polycrystalline material is not usable in some of the new missile designs which use both UV and IR sensing. It should be noted however that if a polycrystalline material, such as MgF$_2$, is grown by epitaxial chemical vapor deposition techniques, such that all the grains or crystallites are oriented in the same direction, then such polycrystalline material would have low scattering tendencies. MgF$_2$ has successfully withstood not only environmental testing but has a long and dependable history of actual use as a window and a dome material in beforementioned missile programs. It has also seen a continuing use as the coating material for both Stinger POST and Stinger RMP windows.

The material properties of MgF$_2$ are summarized in Table 1 below:

TABLE 1

| SINGLE CRYSTAL MAGNESIUM FLUORIDE Physical Property Data | |
|---|---|
| Youngs Modulus | 20.1 × 10$^6$ lbs./in.$^2$ |
| Shear Modulus | 7.93 × 10$^6$ lbs./in.$^2$ |
| Bulk Modulus | 14.7 × 10$^6$ lbs./in.$^2$ |
| Modulus of Rupture | 10,000 lbs./in.$^2$ |
| Knoop Hardness | 415 |
| Thermal Expension Coeff. | 8.48 × 10$^{-6}$/°C. ⊥ c |
| | 13.7 × 10$^{-6}$/°C. ∥ c |
| Thermal Conductivity | 25 watts/cm° K. @ 20° K. |
| | 0.3 watts/cm° K. @ 300° K. |
| Melting Point | 1270° C. |
| Specific Gravity | 3.176@23.5° C. |
| Refractive Index | 1.389$_e$, 1.377° @ 644 nm |
| | 1.385$_e$, 1.373° @ 1083 nm |
| | 1.35 @ 4000 nm |
| Transmittance | Exceeds MIS-23698 (dated 12 Feb. 1987) without AR coating |

Young's modulus, shear modulus, and bulk modulus are as set forth in H. Kandil, et al., *J. Appl. Phys.*, at pages 52 and 759 (1979). Modulus of rupture, Knoop Hardness, melting point, specific gravity, and transmittance are measured data. Thermal expansion coefficient is as set forth in A. Feldman, et al., N.B.S. Technical Note 993. Thermal conductivity is as set forth in R. Kashnow, et al., *J. Phys. Chem. Solids* 30,813 (1969), and refractive index is as set forth in J. Malitson, et al., *Handbook of Optics*, pp. 7–95 (1962).

Availability, quality and price of the single crystal MgF$_2$ was investigated. Three potential sources were located, including at least one in volume production. All three sources are domestic manufacturers. The crystals were developed for laser applications and therefore are of very high quality with low absorption and low scattering. They were free of inclusions, voids and veils (the equivalent of striae in glass).

Figure 2:
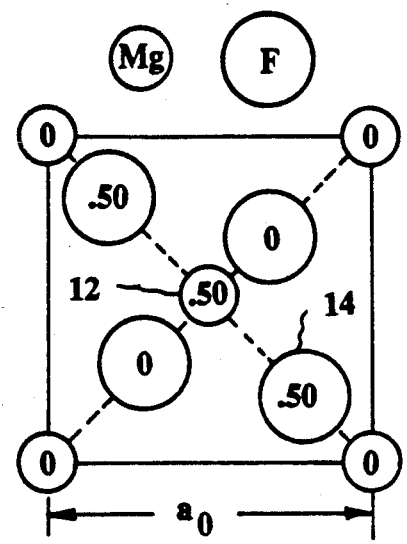
FIG. 2 is the atomic arrangement of the tetragonal unit of the single crystal MgF$_2$.

Further, prototypes for evaluation were developed. A single crystal boule was sawn perpendicular to the c axis. FIG. 2 illustrates the atomic arrangement in the tetragonal unit of MgF$_2$ projected on the basal face or C axis. The small circles 12 represent the magnesium atoms, while the large circles 14 represent the fluoride atoms.

Figure 3:
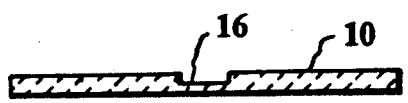
FIG. 3 is a cross-sectional view along the lines 3—3 of FIG. 1 illustrating the cross-section of the window and, in an exemplary way, the incorporated burst riser.

A process was developed to surface the windows to specifications which involved sawing or slicing the single crystal boule into windows which are then surfaced to yield high transmission in the UV and IR. Reproducibility of the surfacing process was established with respect to both proof and burst pressures, allowing provision for the burst riser 16 as shown in FIG. 3 to be optional. FIG. 3 is a cross-sectional view of the window 10 of FIG. 1 along line 3'-3". As mentioned above, the low refractive index eliminated the need for an anti-reflection coating, and the chemical stability of the MgF2 material eliminated the need for a protective coating. The elimination of the two steps involved in providing these coatings and the avoidance of the in-process staining problems, greatly simplifies the manufacturing process thus improving quality and further reducing cost.

Standard Military Specifications, including Mil-O-13830; Mil-C-48497; Mil-STD-105, 129, 130, 810, and their methods, were used to evaluate prototype windows produced as described. The windows were found to meet or exceed all Stinger RMP requirements.

Figure 4:
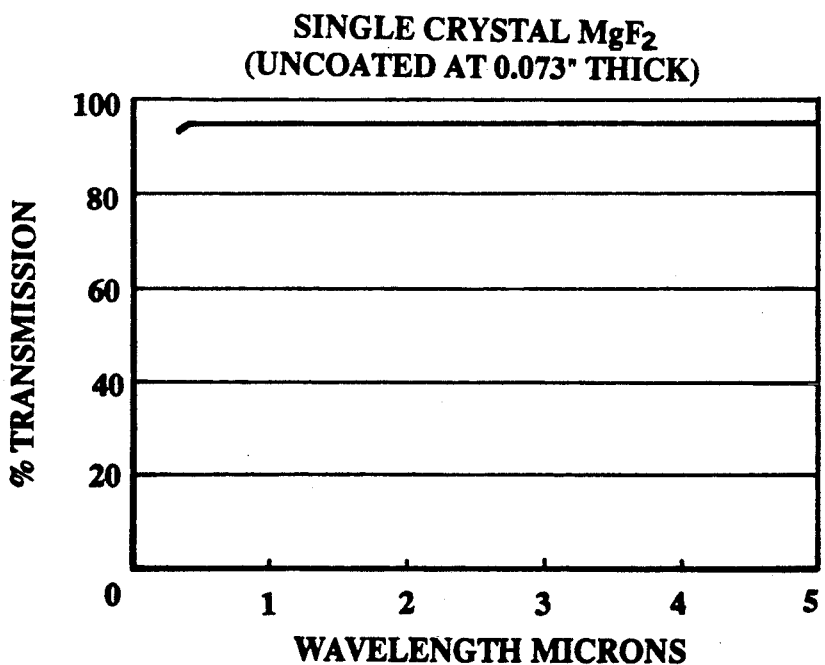
FIG. 4 is a graphical representation of the percent transmission versus wavelength for single crystal MgF$_2$.

Transmission measurements in both the UV and IR were made on calibrated spectrophotometers and are shown in FIG. 4. It is important that the window material selected retains its transmission in use. The test results indicate that calcium aluminate glass colors when exposed to UV radiation, including the UV radiation in sunlight. To determine the extent that calcium aluminate glass or single crystal MgF2 colors, both were exposed to outdoor noon sunlight at 68 F. for 30 minutes. There was no measurable change in the single crystal MgF2 transmission, but the transmission loss of the calcium aluminate window measured 10% to 20% in the wavelength range from 300 nm to 440 nm, and over 5% in other regions.

Figure 5:
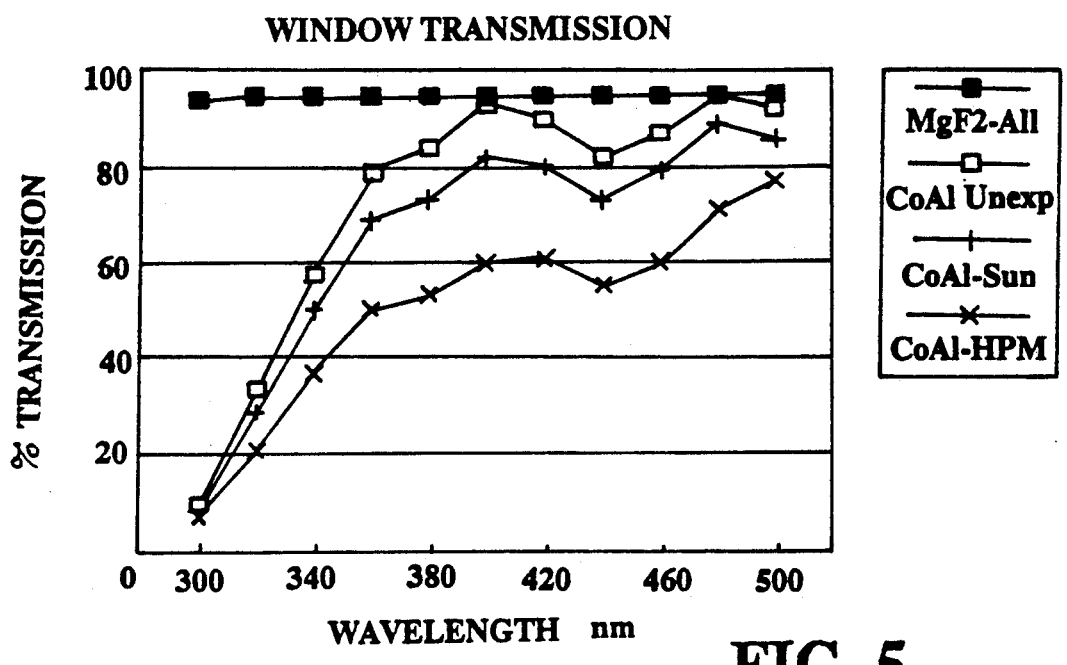
FIG. 5 is a graphical representation of percent window transmission at various wavelengths (after 30 minutes UV exposure for MgF$_2$ and for calcium alumina e windows at various exposures)
Figure 6:
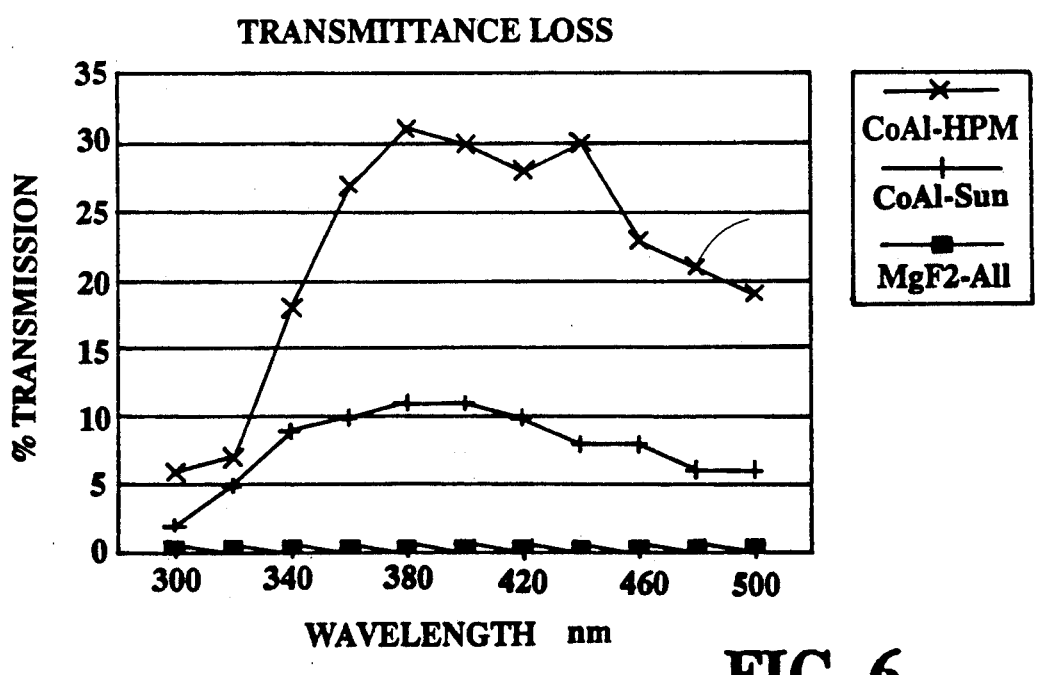
FIG. 6 is a graphical representation of the percent transmission loss versus wavelength (after 30 minutes of UV exposure for MgF$_2$ and calcium aluminate windows after various exposures)
Figure 7:
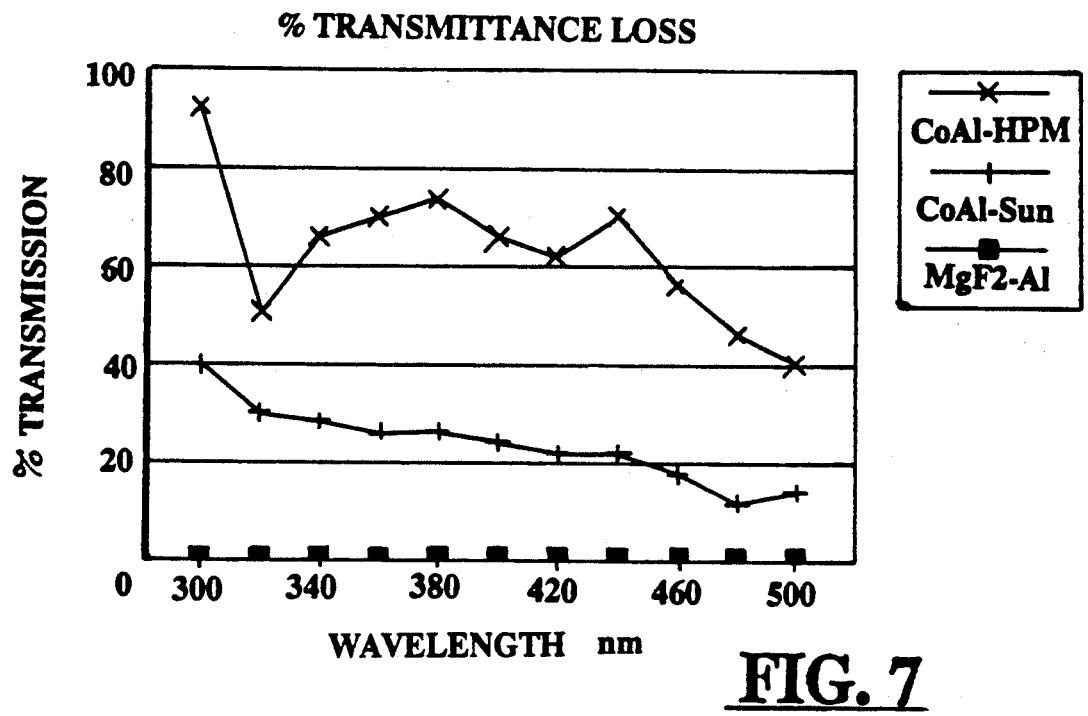
FIG. 7 is a graphical representation of the percent transmittance loss versus wavelength (after 30 minutes of UV exposure for MgF$_2$ and calcium aluminate after various exposures)

To ascertain if increased exposure to UV would cause absorption in single crystal MgF2, samples of both materials, the MgF2 and calcium aluminate (CaAl) glass, were placed under an intense Hanovia high pressure mercury arc lamp (Model #679A-10) for 30 minutes. No change was observed in the single crystal MgF2, but the calcium aluminate (CaAl) glass transmission loss was over 30%. The variability of the calcium aluminate glass to photochromic effects was determined for five random samples. The data is presented in graphical and tabular form in FIG. 5, 6, and 7 and Tables 2, 3, and 4, respectively. In Table 2 samples 101, 102, 103, 104, 105, and 106 are all CaAl. The calcium aluminate glass used in this test was a commercially available glass currently in use for these windows and manufactured by Barr & Stroud at the Strathleven Works, Vale of Leven Industrial Estate, Dumbarton G82 3PP, Scotland.

TABLE 2

EFFECT OF SUNLIGHT AND UV RADIATION ON WINDOWS
Measured Percent Transmission of Window Before and After
30 min. Exposure to UV
Stored in Dark After Exposure for Time Noted

| Sample /Source | Dark | Wavelength nm | | | | | | | | | | |
|---|---|---|---|---|---|---|---|---|---|---|---|---|
| | | 300 | 320 | 340 | 360 | 380 | 400 | 420 | 440 | 460 | 480 | 500 |
| 101 | Before | 10 | 34 | 58 | 79 | 84 | 93 | 90 | 82 | 87 | 95 | 92 |
| Sun | 15 min | 8 | 29 | 50 | 69 | 73 | 82 | 80 | 73 | 79 | 89 | 86 |
| Sun | 60 min | 8 | 29 | 50 | 69 | 74 | 83 | 80 | 74 | 80 | 89 | 87 |
| 102 | Before | 13 | 28 | 55 | 77 | 84 | 90 | 89 | 85 | 83 | 92 | 96 |
| HPM | 15 min | 7 | 21 | 37 | 50 | 53 | 60 | 61 | 55 | 60 | 71 | 77 |
| HPM | 16 hr | 7 | 22 | 45 | 64 | 72 | 82 | 81 | 75 | 78 | 88 | 91 |
| 103 | Before | 14 | 27 | 57 | 77 | 85 | 90 | 93 | 87 | 84 | 90 | 95 |
| HPM | 16 hr | 7 | 22 | 46 | 64 | 72 | 78 | 85 | 78 | 76 | 85 | 92 |
| 104 | Before | 9 | 32 | 57 | 79 | 84 | 94 | 89 | 82 | 88 | 96 | 92 |
| HPM | 16 hr | 5 | 14 | 38 | 51 | 58 | 62 | 67 | 64 | 64 | 73 | 81 |
| 105 | Before | 12 | 34 | 60 | 79 | 84 | 93 | 90 | 82 | 86 | 95 | 94 |
| HPM | 16 hr | 7 | 25 | 44 | 61 | 67 | 76 | 73 | 71 | 80 | 88 | 84 |
| 106 | Before | 10 | 34 | 59 | 79 | 83 | 89 | 93 | 86 | 82 | 90 | 95 |
| HPX | 15 min | 8 | 29 | 51 | 70 | 77 | 83 | 87 | 80 | 77 | 85 | 90 |
| MgF2 | Before | 94 | 95 | 95 | 95 | 95 | 95 | 95 | 95 | 95 | 95 | 95 |
| All | 15 min | 94 | 95 | 95 | 95 | 95 | 95 | 95 | 95 | 95 | 95 | 95 |
| All | 16 hr | 94 | 95 | 95 | 95 | 95 | 95 | 95 | 95 | 95 | 95 | 95 |

Source:
Sun = Sun at Noon, outside temperature 68° F.
HPM = High Pressure Mercury Arc Lamp (450 watts)
HPX = High Pressure Xenon Arc Lamp (200 watts)

TABLE 3

EFFECT OF UV RADIATION ON WINDOW TRANSMISSION
Decrease in Percent Transmission

| | Material | | | | | |
|---|---|---|---|---|---|---|
| | CaAl | CaAl | CaAl | MgF2 | MgF2 | MgF2 |
| | Sample | | | | | |
| | 101 | 102 | 106 | 110 | 111 | 112 |
| Source | Sun | HPM | HPX | Sun | HPM | HPX |
| 300 nm | 2 | 6 | 2 | 0 | 0 | 0 |
| 320 nm | 5 | 7 | 5 | 0 | 0 | 0 |
| 340 nm | 9 | 18 | 8 | 0 | 0 | 0 |
| 360 nm | 10 | 27 | 9 | 0 | 0 | 0 |
| 380 nm | 11 | 31 | 6 | 0 | 0 | 0 |
| 400 nm | 11 | 30 | 6 | 0 | 0 | 0 |
| 420 nm | 10 | 28 | 6 | 0 | 0 | 0 |
| 440 nm | 8 | 30 | 6 | 0 | 0 | 0 |
| 460 nm | 8 | 23 | 5 | 0 | 0 | 0 |
| 480 nm | 6 | 21 | 5 | 0 | 0 | 0 |
| 500 nm | 6 | 19 | 5 | 0 | 0 | 0 |

| | Material | | | | | |
|---|---|---|---|---|---|---|
| | CaAl | CaAl | CaAl | CaAl | CaAl | MgF2 |
| | Sample | | | | | |
| | 101 | 102 | 103 | 105 | 106 | 110–112 |
| | | | | After~ | | |
| | 1 hr | 16 hr | 16 hr | 16 hr | 16 hr | 16 hr |
| Source | Sun | HPM | HPM | HPM | HPM | HPM |
| 300 nm | 2 | 6 | 7 | 4 | 5 | 0 |
| 320 nm | 5 | 6 | 5 | 18 | 9 | 0 |
| 340 nm | 8 | 10 | 11 | 19 | 16 | 0 |
| 360 nm | 10 | 13 | 13 | 28 | 18 | 0 |
| 380 nm | 11 | 12 | 13 | 26 | 17 | 0 |
| 400 nm | 11 | 8 | 12 | 32 | 17 | 0 |
| 420 nm | 10 | 8 | 8 | 22 | 17 | 0 |
| 440 nm | 9 | 10 | 9 | 18 | 11 | 0 |
| 460 nm | 8 | 5 | 8 | 24 | 6 | 0 |
| 480 nm | 6 | 4 | 5 | 23 | 7 | 0 |
| 500 nm | 6 | 5 | 3 | 11 | 10 | 0 |

~Transmission Measured after storage in dark for 15 minutes unless a longer time is indicated as in lower listing.

TABLE 4

EFFECT OF UV RADIATION ON WINDOW TRANSMISSION
Percent Decrease in Percent Transmission

| | Material | | | | | |
|---|---|---|---|---|---|---|
| | CaAl | CaAl | CaAl | MgF2 | MgF2 | MgF2 |
| | | | | Sample | | |
| Source | 101 Sun | 102 HPM | 106 HPX | 110 Sun | 111 HPM | 112 HPX |
| 300 nm | 20 | 46 | 20 | 0 | 0 | 0 |
| 320 nm | 15 | 25 | 15 | 0 | 0 | 0 |
| 340 nm | 14 | 33 | 14 | 0 | 0 | 0 |
| 360 nm | 13 | 35 | 11 | 0 | 0 | 0 |
| 380 nm | 13 | 37 | 7 | 0 | 0 | 0 |
| 400 nm | 12 | 33 | 7 | 0 | 0 | 0 |
| 420 nm | 11 | 31 | 6 | 0 | 0 | 0 |
| 440 nm | 11 | 35 | 7 | 0 | 0 | 0 |
| 460 nm | 9 | 28 | 6 | 0 | 0 | 0 |
| 480 nm | 6 | 23 | 6 | 0 | 0 | 0 |
| 500 nm | 7 | 20 | 5 | 0 | 0 | 0 |

| | Material | | | | | |
|---|---|---|---|---|---|---|
| | CaAl | CaAl | CaAl | CaAl | CaAl | MgF2 |
| | | | | Sample | | |
| | 101 | 102 | 103 | 105 | 106 | 110–112 |
| | | | | After~ | | |
| Source | 1 hr Sun | 16 hr HPM | 16 hr HPM | 16 hr HPM | 16 hr HPM | 16 hr HPM |
| 300 nm | 20 | 46 | 50 | 44 | 42 | 0 |
| 320 nm | 15 | 21 | 19 | 56 | 26 | 0 |
| 340 nm | 14 | 18 | 19 | 33 | 27 | 0 |
| 360 nm | 13 | 17 | 17 | 35 | 23 | 0 |
| 380 nm | 12 | 14 | 15 | 31 | 20 | 0 |
| 400 nm | 11 | 9 | 13 | 34 | 18 | 0 |
| 420 nm | 11 | 9 | 9 | 25 | 19 | 0 |
| 440 nm | 10 | 12 | 10 | 22 | 13 | 0 |
| 460 nm | 8 | 6 | 10 | 27 | 7 | 0 |
| 480 nm | 6 | 4 | 6 | 24 | 7 | 0 |
| 500 nm | 5 | 5 | 3 | 12 | 11 | 0 |

~Transmission Measured after storage in dark for 15 minutes unless a longer time is indicated as in lower listing.

TABLE 5

| Burst Pressure psi. - Single Crystal MgF2 | | | |
|---|---|---|---|
| Type | Mgf. #1 | Mfg. #2 | Combined |
| Avg. | 20.9 | 22.0 | 21.5 |
| Std. | 1.6 | 1.1 | 1.5 |

| Burst Pressures psi. - Calcium Aluminate Glass | | | |
|---|---|---|---|
| Test | #1 | #2 | #3 | #4 |
| Avg. | 20.2 | 20.4 | 18.3 | 18.2 |
| Std. | 1.9 | 1.8 | 1.7 | 1.5 |

| | Number | Pass | Fail | Yield |
|---|---|---|---|---|
| Proof Pressure Data - Single Crystal MgF2 | | | | |
| R&D Testing: | 7 | 7 | 0 | 100% |
| QC Testing: | 16 | 15 | 1 | 94% |
| Combined: | 23 | 22 | 1 | 96% |
| Proof Pressure Data - Calcium Aluminate Glass | | | | |
| QC Tests A: | 188 | 170 | 18 | 90% |
| QC Tests B: | 780 | 739 | 41 | 95% |
| Combined: | 968 | 909 | 59 | 94% |

TABLE 6

SCATTER MEASUREMENTS

| CaAl Windows (Microwatts) | MgF2 Windows (Microwatts) |
|---|---|
| 80.2 | 16.7 |
| 52.5 | 24.6 |
| 76.5 | 13.2 |
| 54.4 | 14.2 |
| 60.7 | 24.9 |
| 63.0 | 22.7 |
| 91.3 | 15.7 |
| 60.0 | 14.6 |
| 86.6 | 15.4 |
| 51.5 | 17.0 |
| 67.7 Average | 17.9 Average |
| 63.7 Corrected for Background | 13.9 Corrected for Background |
| 0.414% Scatter | 0.091% Scatter |

As shown by the above data from the Tables and in particular from Tables 2 through 4, the calcium aluminate window undergoes significant transmittance losses when exposed to sunlight for as short a time as 15 minutes. This loss is retained at room temperature and below. If the calcium aluminate is heated to 400 F. or more, most, but not all of the transmission is recovered. When exposed to sunlight at temperatures below 70 F. serious transmittance losses can occur in a relatively short time.

Figure 8:
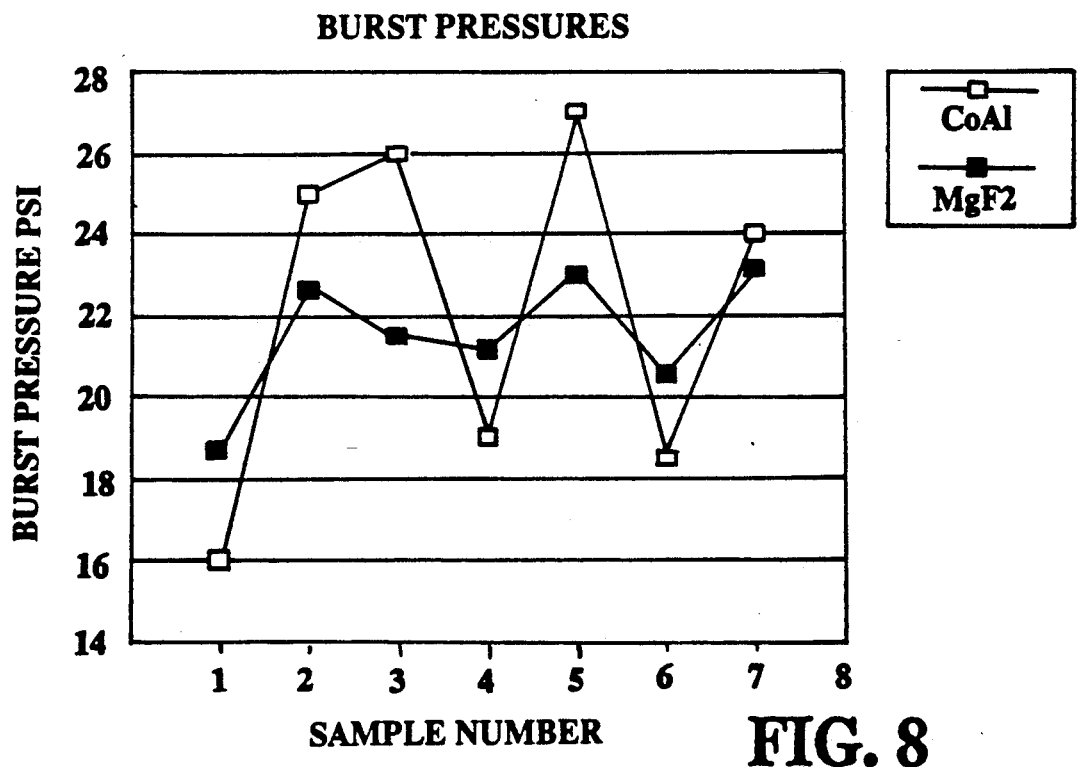
FIG. 8 is a graphical representation of burst pressures for various samples of calcium aluminate and single crystal MgF$_2$.

An exacting effort was devoted to proof and burst testing since the burst riser was eliminated as a control element. The results are summarized and compared to that obtained with the use of a burst riser in calcium aluminate glass in FIG. 8 and Table 5. Even without a burst riser 16, the single crystal MgF2, showed an improved statistical distribution and higher yields. The modulus of rupture given in Table 1 was calculated from R&D burst pressure data (seven samples from two separate material sources) using the below-mentioned standard breaking stress equation for a circular plate:

$$S = \frac{pr^2}{t^2}$$

where S is developed stress (lbs/in$^2$), p is unit pressure (lbs/in$^2$), uniformly distributed over the plate (window), r is radius of unsupported circular area of the window (in.), and t is thickness of the window (in.).

Figure 9:
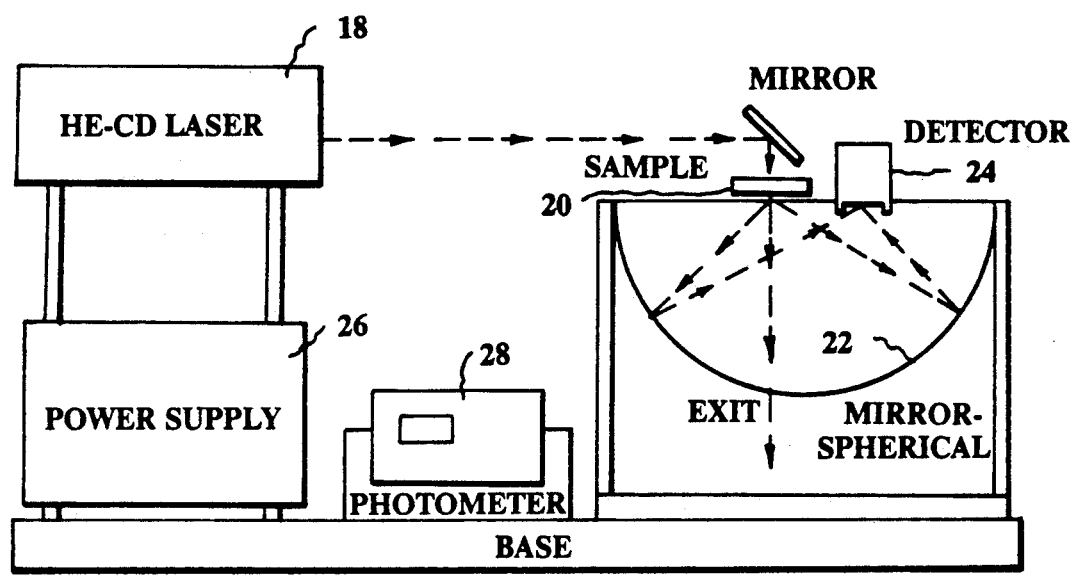
FIG. 9 is a schematic illustration of a scattered light instrumentation system.

Scatter measurements were carried out, to provide a means to reproduce the degree of surface polish and to provide data for future specifications relative to detection limits of this and similar optical systems. As illustrated in FIG. 9, a system to carry out scatter measurements of the forward integrated scatter were made using a 3 mw HeCd laser 18 at 442 nm. The sample 20 was placed at one conjugate foci of a 12 inch diameter hemispherical mirror 22 and focused onto a blue sensitive Si detector 24 located at the second conjugate foci. This data collected from the instrument schematically illustrated in FIG. 9 is given in Table 6. The Table 6 values are below that of unstained calcium aluminate glass by a factor of four, and more than an order of magnitude below that of the stained areas allowed under current specifications for the window in accordance with Drawing 13154966. In FIG. 9 other components of the scatter light measurement instrumentation are listed and shown diagramatically and include a laser power supply 26 and a D.C. photometer 28 which is a VDT photometer Model 5350.

Once a standard process was established, a lot of 16 single crystal MgF2 windows were prepared for evaluation against MIS-23698E and the window launch tube Drawing 13154966. All drawing specifications were met, except for optional elimination of the burst riser and the AR coating. All six MIS 23698E tests were satisfactory with the exception of proof pressure, where one part out of 16 failed.

Both higher quality and lower costs can be achieved for missile window products by the use of single crystal MgF$_2$. Single crystal MgF$_2$ has a number of desirable properties and advantages which combine to produce higher quality and lower cost as previously set forth.

Although this invention has been described in terms of certain preferred embodiments, other embodiments that are apparent to those of ordinary skill in the art are also within the scope of this invention. Accordingly, the scope of this invention is intended to be limited only by the appended claims.

What is claimed is:

1. An optical window of the type used in missile guidance systems, wherein such windows of constant configuration and dimension will repeatedly fracture at desired pressures that do not deviate from each other by more than approximately 4 lbs. per square inch, comprising:
a magnesium fluoride material, said material is a polycrystalline structure with the crystallites substantially unidirectionally oriented or a single crystal, said material effectively dimensioned for said repeatable desired fracture pressure.

2. The optical window of claim 1 wherein said effectively dimensioned window comprises a burst riser to achieve said desired pressure.

3. The optical guidance window as defined in claim 2, wherein the window has been mechanically altered to form a burst riser.

4. The optical guidance window as defined in claim 2, wherein the burst riser comprises an area of the window which either differs structurally or chemically from the balance of the window.

5. In an optical missile window of the type requiring
    (1) an antireflective (AR) coating to allow transmission of light over both UV and IR spectral ranges, or
    (2) a burst riser to achieve uniform burst pressures at desirable values, the improvement comprising:
    a magnesium fluoride material forming said window having a polycrystalline structure with crystallites substantially unidirectionally oriented or of a single crystal of magnesium fluoride, wherein neither AR coatings nor burst risers are required.

6. The use of magnesium fluoride having a polycrystalline structure with the crystallites substantially unidirectionally oriented or a single crystal of magnesium fluoride to form an optical window for use in missile guidance systems wherein said windows transmit light over both UV and IR spectral ranges and are effectively dimensioned or include a burst rider to achieve a uniform burst pressure at desired values.

7. The use of claim 6 wherein said window is formed without a burst riser for a desired burst pressure which will not deviate between identical windows by more than approximately 4 lbs. per square inch.

* * * * *